United States Patent [19]

Komauer et al.

[11] Patent Number: 4,529,060
[45] Date of Patent: Jul. 16, 1985

[54] ABSORPTION MUFFLER FOR GAS-DYNAMIC PRESSURE-WAVE MACHINES

[75] Inventors: Christian Komauer, Rieden; Fritz Spinnler, Liestal; Tony Kollbrunner, Herrliberg, all of Switzerland

[73] Assignee: BBC Brown, Boveri & Company, Limited, Baden, Switzerland

[21] Appl. No.: 582,485

[22] Filed: Feb. 22, 1984

[30] Foreign Application Priority Data

Feb. 23, 1983 [CH] Switzerland .................. 1016/83

[51] Int. Cl.$^3$ .............................................. F01N 1/04
[52] U.S. Cl. ........................................ 181/227; 181/252
[58] Field of Search .................. 181/227, 252, 256, 282

[56] References Cited

U.S. PATENT DOCUMENTS

| | | | |
|---|---|---|---|
| 2,326,612 | 8/1943 | Bourne .................................. | 181/252 |
| 2,914,132 | 11/1959 | Bourne et al. ........................ | 181/252 |
| 3,263,772 | 8/1966 | Irwin et al. .......................... | 181/227 |
| 4,263,981 | 4/1981 | Weiss et al. ......................... | 181/252 |

FOREIGN PATENT DOCUMENTS

| | | | |
|---|---|---|---|
| 742529 | 12/1955 | United Kingdom ................ | 181/227 |
| 986576 | 3/1965 | United Kingdom ................ | 181/256 |

Primary Examiner—Benjamin R. Fuller
Attorney, Agent, or Firm—Burns, Doane, Swecker & Mathis

[57] ABSTRACT

Whereas the total noise level of an internal combustion engine supercharged by means of a gas-dynamic pressure-wave engine (1) (PWS) is usually only slightly higher than that of an engine supercharged by means of an exhaust-gas turbo supercharger (ETS), the narrow-band noise in the PWS rotational sound frequency range, the so-called PWS "whistle", is considered troublesome. The absorption muffler (3) is an elongate body, the length ($l_1$) of which is at least 10 times the rotor outside diameter of the PWS. The inside diameter (d) of the muffler (3) corresponds to the inside diameter of the exhaust pipe (4) and is at least 0.6 times the rotor outside diameter of the PWS. The thickness (S) of the insulating material, which directly surrounds the inside diameter (d) or inner cross-section (F) of the muffler (3), is at least 6 times the rotor outside diameter of the PWS divided by the number of cells of the PWS.

5 Claims, 8 Drawing Figures

ABSORPTION MUFFLER FOR GAS-DYNAMIC PRESSURE-WAVE MACHINES

The invention relates to an absorption muffler for an internal combustion engine supercharged by means of a gas-dynamic pressure-wave machine.

Whereas the total noise level of an engine equipped with a gas-dynamic pressure-wave machine (referred to below as a pressure-wave supercharger PWS) is generally no higher or only slightly higher than that of an engine supercharged by means of an exhaust-gas turbo-supercharger (ETS), the narrow band noise in the PWS rotational sound frequency range, the so-called PWS "whistle", is considered troublesome. Accordingly, the exhaust noise of a PWS-supercharged diesel engine has a fundamentally different sound characteristic than that of a suction engine or an ETS-supercharged engine. In a PWS-supercharged engine, the low-frequency noise portions of the individual exhaust surges fall away because there is no direct connection between the exhaust manifold and the exhaust pipe; what remains is a high-frequency siren-like noise which is perceived as a "whistle".

It is known that silencing occurs when the sound wave enters absorbent material where its energy is converted into heat.

Swiss Patent Specification No. 559,310 describes, for example, such a silencing process.

Measures intended to reduce the noises on the same side as the supercharging air are also known. Thus, the supercharging-air line is given a sound-proofing design by means of mechanical preventive measures similar to reflection. The same also applies to the suction line. In both elements, good results are achieved by introducing an elbow. A further preventive measure is to encase the entire pressure-wave machine. The effect resulting from this is a reduction in the structure-borne noises. It can be said, in general, that the preventive sound-proofing measures can be located in front of, integrated in or located after the supercharging air line or the suction line.

As regards the arrangement of the silencing exhaust heads, the known solutions take up a large amount of space. It is extremely difficult to guide the exhaust line and accommodate the individual exhaust heads because of the reduced space available in motor vehicles constructed at the present time. A common solution is for the exhaust pipe to open, from the engine block, directly into a first angled exhaust head. This angling is necessary so that the line of the exhaust pipe can be laid along the underside of the vehicle body. A second relatively short exhaust head is located approximately in a center position between the front and rear axles. The particular diameter chosen predetermines the ground clearance of the motor vehicle. Such centrally located exhaust heads often have to be laid in inner recesses which are not easily accessible, and this presents disadvantages as regards assembly and maintenance. From the outlet of this central exhaust head, the exhaust pipe has to be partially bent sharply upwards further to the rear because of the rear axle of the motor vehicle. After the bend portion, the exhaust pipe ends in the rear axle exhaust head. The amount of bending of the exhaust pipe towards the vehicle interior depends on the height of the centrally located exhaust head.

The object of the invention is to provide an absorption muffler which is easy to install in a motor vehicle and is not much thicker than the actual exhaust pipe, so that it is possible to do away with the several exhaust heads hitherto required, whilst ensuring reduced costs, and so that the problems of the layout and bending of the exhaust pipe become simpler.

According to the invention, this object is achieved, in a muffler of a type mentioned in the introduction, by means of the characterising features of patent claims 1 or 2.

As regards the reference to the rotor outside diameter and the number of rotor cells of the PWS, attention is drawn, for example, to DE-A- No. 2,452,269 which relates to the geometry of the pressure-wave machine.

The muffler according to the invention preserves the advantages of known mufflers as regards absorption. The components necessary for this purpose are simple and cheap and present no difficulties in their assembly.

However, the main advantage is the compact elongate design which allows the muffler to be accommodated without difficulty. The layout of the exhaust pipes connected to the muffler is therefore simpler, especially in the region of the rear axle of the motor vehicle, which can be bridged without any substantial bending of the exhaust pipe.

In an advantageous embodiment of the muffler, absorption takes place immediately downstream of the pressure-wave supercharger. The double-angled layout of the exhaust pipe from the pressure-wave supercharger is encased by a muffler using a known method of absorption. In this embodiment the exhaust pipe is no longer interrupted after the muffler, and accordingly, it can also be laid easily. Furthermore, it is possible to gain access more simply to the muffler from the direction of the engine hood.

A further advantageous possibility arises because an integrated additional muffler body is installed in a compact elongate muffler. As a result, the muffler can have an even flatter design, thus making it ideal to accommodate.

Finally, the exhaust pipe can carry several elongate mufflers, and this has a positive effect on absorption. Moreover, it is advantageous for reducing the noise level if the elongate mufflers have resonators.

Exemplary embodiments of the invention are explained below with reference to the drawing in which.

None of the elements which are unimportant for understanding the invention are shown. The same elements bear the same reference numerals in the various Figures. The exhaust-gas flow direction is indicated by arrows.

Figure 1:
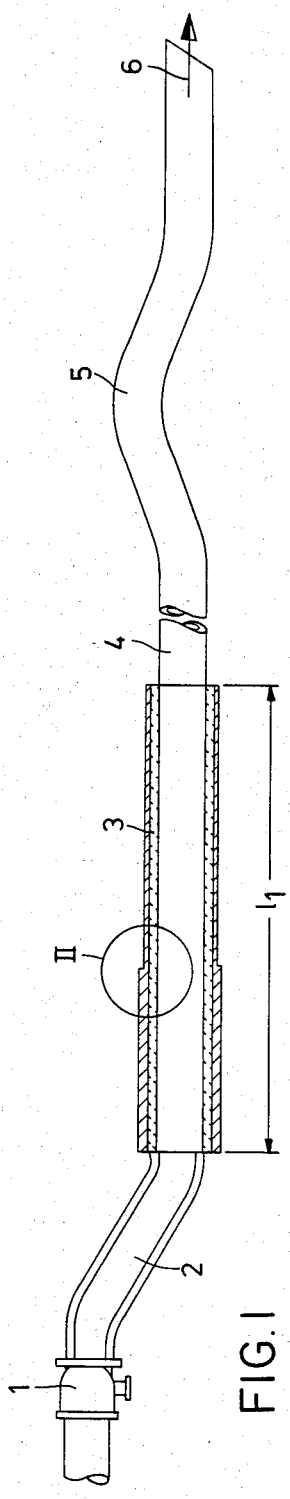
FIG. 1 shows a view of the entire exhaust system with an elongate muffler.

FIG. 1 shows a diagrammatic view of the entire exhaust system. A double-walled pipe 2 is joined downstream to the pressure-wave supercharger 1 which is itself connected downstream to an engine block (not shown). From a higher position, the double-walled pipe 2 describes a double arc downwards and then extends approximately in a straight line over the entire underside of the body (not shown) at least up to the rear axle, also not shown, of the motor vehicle. The double-walled pipe 2 provided ensures that the structure-borne sound becomes less and the susceptibility to vibration reduced considerably. When the interspace in the double-walled pipe 2 is filled with basalt, this additionally reduces the structure-borne sound and the vibrations; furthermore, the double-walled pipe 2 thereby acquires a certain rigidity. After the double arc, the double-walled pipe 2 has adjoining it an absorption muffler 3, the length $L_1$ of which is at least 10 times the rotor outside diameter of the pressure-wave supercharger 1. The external shape of the elongate absorption muffler 3 is not necessarily round. Depending on the conditions of space, the absorption muffler 3 can also assume an oval flattened shape. The inside diameter d of the muffler 3 corresponds approximately to the inside diameter of the exhaust pipe 4, the former diameter measurement d depending, in turn, on the rotor outside diameter of the pressure-wave supercharger, specifically being at least 0.6 of this.

As stated above, the inside diameter d of the muffler corresponds to the inside diameter of the exhaust pipe 4. When the absorption muffler is given a flattened shape for reasons of space, it is advantageous if the inner gas passage orifice is made geometrically the same, since the absorption muffler 3 thereby has a uniform cross-sectional geometry and the intermediate layer of insulating material 8 is of the same thickness over the entire periphery. In such cases the criterion of comparison between the inner orifice of the absorption muffler 3 and that of the exhaust pipe 4 can no longer be the diameter measurement, but the cross-sectional area F of the two inner orifices will be used in a similar way. After the elongate absorption muffler 3, the exhaust pipe 4 extends, again in a straight line, up to the rear axle of the motor vehicle. If the layout of the exhaust pipe 4 is lower in the direction of the road than the rear axle, the exhaust pipe 4 is bent here so as to bridge the latter. This bend is the minimum necessary in the particular case and takes the form of a gentle arc 5, that is to say in order to avoid sharp angles.

The exhaust pipe 4 then terminates in an end piece 6, the height of which usually corresponds to the run of the front exhaust pipe 4 or absorption muffler 3.

Figure 2:
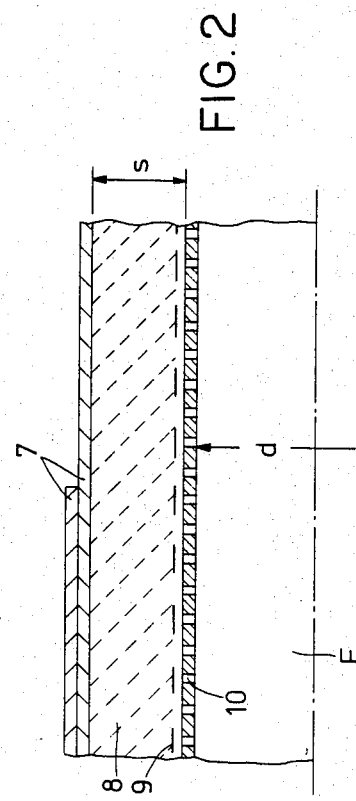
FIG. 2 shows a section through part of an absorption muffler.

FIG. 2 shows a section I—I through part of an absorption muffler 3. Its outer casing consists of a multi-walled pipe 7. Of course, the outer pipe does not need to encase the entire length of the absorption muffler 3; the additional casing need only cover the front part located on the same side as the pressure-wave supercharger, in order to ensure stability and damping. A sound-absorbing insulating material 8, for example mineral wool, of thickness S surrounds the inner contour of the perforated sheet 10, and as already explained, this inner contour does not necessarily have to be round. Installed between the insulating material 8 and the perforated sheet 10 is a metal netting 9 which prevents the insulating material 8 from being blown out. The hole division and the size of the perforation in the perforated sheet 10 depend on the size of the pressure-wave supercharger 1. This thickness S of the insulating material 8 depends on the outside diameter and the number of cells of the rotor of the pressure-wave supercharger 1, and, expressed mathematically, the following formula is applicable:

$$\text{Insulation thickness } S = \frac{6 \times \text{rotor outside diameter}}{\text{number of cells}} \times$$

A relatively small insulating thickness S is thus obtained, because, as mentioned in the introduction, only high-frequency noises have to be damped in the case of PWS supercharging.

The perforation of the perforated sheet 10 does not necessarily have to consist of round holes. In view of the notch effect, it will always be advantageous if sharp edges are avoided; oval slits would therefore be immediately suitable for this purpose. Of course, it is possible for the perforation in the perforated sheet 10 to consist of geometrically different orifices within one and the same system.

Figure 3:
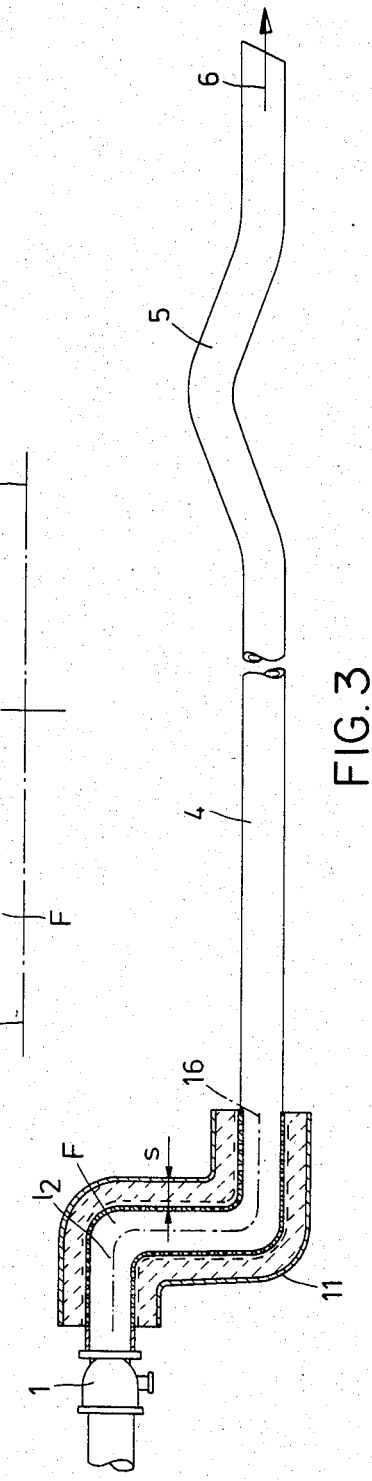
FIG. 3 shows a further view of the entire exhaust system with a double-angled muffler.

FIG. 3 shows a further diagrammatic view of the entire exhaust system. The absorption muffler 11 differs in shape and position from the elongate form illustrated in FIG. 1. Connected immediately after the outlet of the pressure-wave supercharger is a double-angled absorption muffler 11 which matches the layout of the exhaust pipe 4 from the plane of the engine sheeting down to the underside of the motor-vehicle body. What was said in relation to FIGS. 1 and 2 also applies here, with a restriction, as regards the technical features. The extended length $L_2$ of the double-angled muffler 11 is approximately only half as much as the length $L_1$ of the elongate muffler 3. This is largely because a double-angled muffler 11 also produces reflection effects as a result of its geometry. Consequently, the reduction in noise level does not have to be achieved solely by means of absorption. The double-angled muffler 11 does not necessarily have to be round on its periphery. Where conditions of space do not allow it, an oval flattened shape will be adopted. The lower flow transition between the muffler 11 and the exhaust pipe 4 has the form of a funnel 16. As is known, this form produces reflections, and this has a positive effect in minimizing the noise level.

Figure 4:
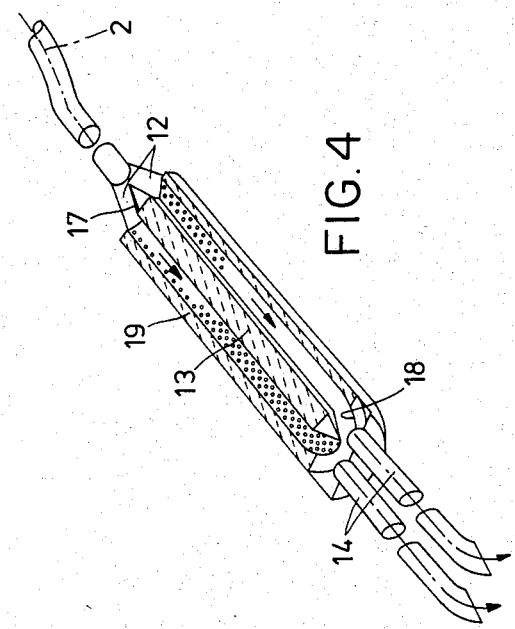
FIG. 4 shows a section through a muffler, illustrated in perspective, with an additional muffler body.
Figure 5:
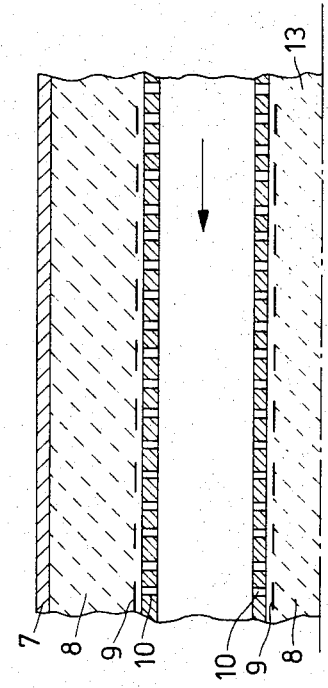
FIG. 5 shows a longitudinal section through FIG. 4.

FIG. 4 shows a flattened elongate muffler 19 which is provided with a tube 13 designed in its inner orifice and over its entire length as an additional muffler body. The throughflow orifice of this muffler 19 has annularly a varying cross-sectional area F. As emerges from FIG. 5, the muffler 19 consists of an outer casing 7. A layer of insulating material 8 surrounds the perforated sheet 10; a wire netting 9 is likewise provided for known reasons. The tube 13, which fills the throughflow orifice in a similar manner to a core, consists of an outer perforated sheet 10. The interior of the tube 13 is filled with insulating material 8. Here again, a wire netting 9 prevents the insulating material 8 from being blown out. The tube 13 can be suspended on the inside of the throughflow orifice by means of wing plates according to the principal which has proved appropriate.

At the entrance of the muffler 19, the double-walled exhaust pipe 2 merges into a funnel-shaped exhaust pipe 12. The tube 13 is made conical upstream at 17. The cross-sectional throughflow area F corresponds to the cross-sectional throughflow area of the exhaust pipe 2. The outlet of the muffler 19 is made funnel-shaped at 18 for known reasons. If conditions of space do not allow it, the exhaust gases from the muffler 19 are conveyed further not by means of one exhaust pipe, but two of them. The advantage of such a twin end exhaust pipe 14 is also that the bend necessary in the region of the rear axle of the motor vehicle can be made easily.

Figure 6:
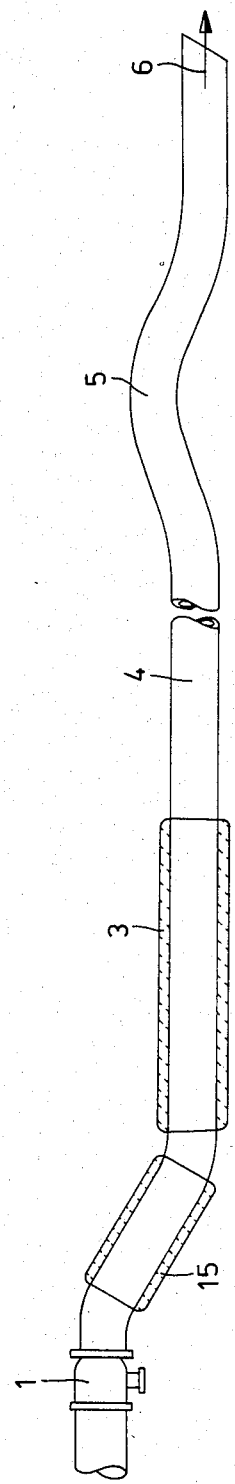
FIG. 6 shows a further view of the entire exhaust system with several elongate mufflers.

FIG. 6 shows an exhaust system in which the only difference from FIG. 1 is that a preceding muffler 15 is provided instead of the double-walled pipe 2. Of course, where conditions require it, several elongate mufflers can also be distributed over the entire layout of the exhaust pipe 4.

Figure 7:
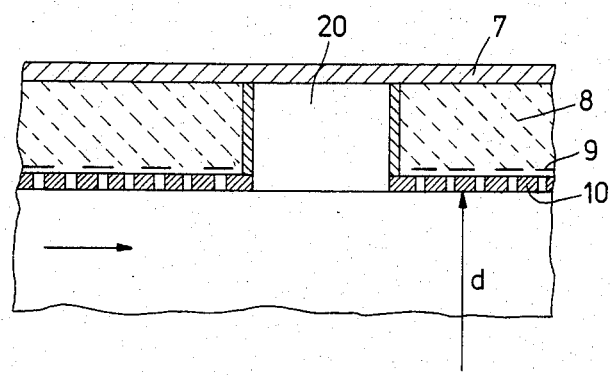
FIG. 7 shows a preventive measure using resonators without damping.

FIG. 7 illustrates the possibility of providing one or more resonators 20 in the elongate muffler 3. The Helmholtz resonator represents the simplest design for a muffler. It consists essentially of an empty volume 20 and a tube adjoining it and open on both sides. This measure is taken in addition to the elongate muffler 3, the resonator 20 being tuned to the whistle frequency of the low-pressure exhaust-gas channels in the PWS.

Figure 8:
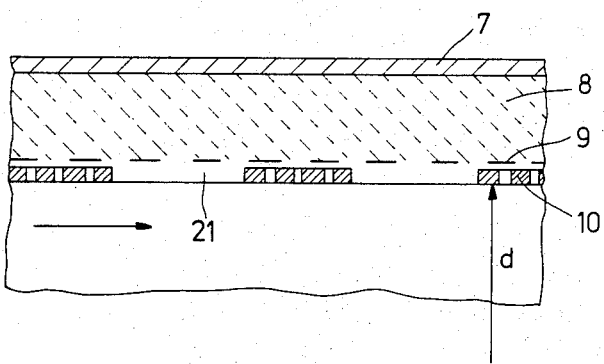
FIG. 8 shows a preventive measure using resonators with damping.

FIG. 8 is based on the same principle. Here, however, the resonators 21 are so designed in construction terms that damping over a wider band is achieved in them, at the same time, at the resonator frequency by incorporating insulating material 8.

We claim:

1. An absorption muffler for internal combustion engines supercharged by means of a gas-dynamic pressure-wave machine, the muffler being at least one elongate body, the length of which is at least 10 times the rotor outside diameter of the gas-dynamic pressure-wave machine and of which the inside diameter, which also corresponds in terms of cross-sectional area approximately to the inside diameter of the exhaust pipe, is at least 0.6 times the said rotor outside diameter, and the thickness of the insulating material, which directly surrounds the inside diameter or inner cross-section of the elongate muffler, is at least 6 times the rotor outside diameter divided by the number of cells of the gas-dynamic pressure-wave machine.

2. An absorption muffler for internal combustion engines supercharged by means of a gas-dynamic pressure-wave machine, the muffler being a double-angled body, the extended length of which is at least 5 times the rotor diameter of the gas-dynamic pressure-wave machine and of which the inside diameter, which also corresponds in terms of cross-sectional area approximately to the inside diameter of the exhaust pipe, is at least 0.6 times the said rotor diameter, and the thickness of the insulating material, which directly encases the inside diamter or inner cross section of the double-angled muffler, is at least 6 times the rotor outside diameter divided by the number of cells of the gas-dynamic pressure-wave machine.

3. An absorption muffler as claimed in claim 1, wherein the elongate body carries in its inside diameter and over its entire length a tube designed as an additional muffler body.

4. An absorption muffler as claimed in claim 1, the muffler consisting of several elongate bodies which are distributed over the exhaust pipe.

5. An absorption muffler as claimed in claim 1, the muffler having one or more resonators.

* * * * *